United States Patent Office 2,780,568
Patented Feb. 5, 1957

2,780,568

METHOD FOR CLEANING WINDSHIELDS

John M. Clark, Oakland, Calif.

No Drawing. Application November 9, 1953,
Serial No. 391,150

5 Claims. (Cl. 134—7)

The present invention relates to a method for cleaning windshields, and in more particular to methods for cleaning automobile windshields involving in particular, the use of cream of tartar, in powdered form; and, in general, a powdered weak acid having low solubility in cool water.

Potassium hydrogen tartrate is also known as cream of tartar, although in such form as usually found in commerce, there may be other substances present.

While cream of tartar is a composition that is old in commerce, being derived from argols, wine lees, and has had many uses including its use as a reagent, medicinally as a refrigerant and diuretic, as an ingredient of baking powder, as a mordant, as a reducing agent, as an ingredient of a powder for removing grease from soft leathers, as well as many other uses, its use alone, in particular, or in combination with other ingredients as a cleaner of automobile windshields is not known.

The cleaning of automobile windshields presents many problems which at first consideration may not be apparent. There is the problem of avoiding injury to the finish on the metal surfaces of the car. There is the problem of cleaning the windshield and not leaving on the automobile residues that spoil its appearance even if such residues do not injure the automobile finish. There is the problem of not injuring the rubber wipers, or squeegees, with which most automobiles are provided. And there is the problem of providing a cleaner that will have more than a brief effect under driving conditions when it is raining. It is exasperating and dangerous when an automobile windshield is cleaned of scum to have it immediately scummed over during a rain.

Thus it is among the objects of the present invention to devise a method of cleaning an automobile windshield so that it will remain vision clear for some time after such cleaning during ordinary road use and during a rain.

Another object of the present invention is the cleaning of an automobile windshield by the use of powdered cream of tartar, or potassium hydrogen tartrate.

Still another object of the present invention is the use in cleaning an automobile windshield of a weak acid relatively insoluble in cool water and in powdered form, other than cream of tartar, but with the same objects as those previously stated for the use of cream of tartar.

The invention possesses other objects and features of advantage, some of which, with the foregoing, will be set forth in the following description of the preferred form of the invention. It is to be understood, however, that variations in the showing made by the said description may be adopted within the scope of the invention as set forth in the claims.

These objects are achieved and many of the defects of the prior art remedied by packaging a suitable powder as herein disclosed in a shaker dispenser, shaking such dispenser so as to deposit the powder on the weather surface of the windshield of an automobile when such windshield is wet and has a film of scum thereon, and then wiping such surface with a rubber squeegee to remove the scum therefrom. The shaker dispenser may be in the form of an ordinary salt cellar, hand operated duster, or other desirable form so that when the dispenser is operated the powdered acid will be distributed over the surface of the windshield. An effective powder dispenser for the present purpose, is that of a small container having flexible sides and an orifice through which the powder is blown in a stream when the sides of the container are quickly squeezed together. It is believed that the material most effective in the present invention is potassium hydrogen tartrate. Ordinarily the powdered acid is applied to the windshield when the windshield is wet so that the tartrate will adhere thereto. Such a condition exists during a rain, and then further rain on the windshield will aid in washing away the scum when the windshield wipers are operated.

The preferred material for use in the present invention is powdered cream of tartar. Some of the other names for this chemical are potassium bitartrate, potassium acid tartrate, and potassium hydrogen tartrate. When usually purchased without further specification the dextro isomer is predominant in the material. However, applicant believes that the other isomers of this acid, as well as of those other acids herein disclosed, are equally effective. Other powdered materials which have been found to give desirable results are boric acid, oxalic acid, tartaric acid, benzoic acid, and potassium bipthalate, potassium acid phthalate. Materials such as potassium sodium tartrate, the complete salts of these acids, and ammonium tartrate are not satisfactory in any degree.

It is believed that these desirable materials are effective in removing oil from a windshield because in their powdered form, the powder and oil, under the working of the windshield wiper, form a disperse system. The water added to the windshield acts to float off the dispersion, may enter into the dispersion, and certainly acts as a lubricant for the wiper, or squeegee, blades. The acid part of the powder is necessary to furnish ions for the system. If the acid were highly soluble there would be present no dispersoids for incorporation into a colloidal system. The acid may, also, act to reduce the bond between the oil and other material adhering to the windshield, and thus promote its removal. It is for this reason, its relatively high solubility, that tartaric acid is a poor material for the present purpose, although, when once a solution has been supersaturated so that the powder is present, it will form a disperse system with oil. It is for this reason that the more insoluble acids are more effective, as shown by the effectiveness of cream of tartar as compared to tartaric acid. Also, the weaker acids are more desirable than the stronger because of the lessened chance of spoiling the finish of an automobile, and because the stronger acids are more soluble.

It is necessary that the powder of the acid have its particles in small enough size so that they may be effective as dispersoids. This size is probably that of the usual range for dispersoids, $1 \times 10^{-7}$ to $1 \times 10^{-5}$ cm. It is probable that the relatively insoluble powder form is, also, effective by acting as a scouring medium, and that it will imbed in the squeegee and gradually go into solution to give a good cleaning action over a long period of time. All soaps go completely into solution and, hence, are quickly washed away when applied during a rain. Further, soaps and most detergents smear if insufficient water is added. This smearing does not occur with the acids of the present invention because of their low solubility. Of course, the acid could be applied to the windshield in liquid suspension if a satisfactory means could be found of maintaining the suspension without detracting from the effectiveness of the powder.

A tabulation is given below of the solubilities and dissociation constants of the various acids herein disclosed to the extent that they were available.

| | Solubility, g./100 cc. | Dissociation constant | |
|---|---|---|---|
| | | $k_1$ | $k_2$ |
| Benzoic acid | 0.29, 20° C | $6.6 \times 10^{-5}$ | $7.3 \times 10^{-5}$ |
| Boric acid | 5.56, 25° C | $5.8 \times 10^{-10}$ | $2 \times 10^{-13}$, 25° C |
| Cream of tartar | 0.645, 25° C | | $6.9 \times 10^{-5}$, 25° C |
| Oxalic acid | 9.5, 15° C | $3.8 \times 10^{-2}$ | $4.9 \times 10^{-5}$, 25° C |
| Phthalic acid | 0.54, 14° C | $1.26 \times 10^{-3}$ | $3.1 \times 10^{-6}$, 25° C |
| Tartaric acid | 133, 25° C | $1.1 \times 10^{-3}$ | $6.9 \times 10^{-5}$, 25° C |

From this table it will be seen that the solubility of tartaric acid is out of the range of the other acids listed, and that oxalic acid is probably too strong and soluble an acid for desirable results. The dissociation constant for potassium acid phthalate is that of the second phthalic acid constant, $k_2$. It is probable that some of the acid salts of oxalic acid would be satisfactory, just as in the case of tartaric acid. The desirable range of solubility would seem to be about 0.5 to 10 g. per 100 cc. of water, and the acidity as measured by the dissociation constant of about $4 \times 10^{-2}$ to $6 \times 10^{-10}$.

Having thus described my invention, its preparation, and its operation, I claim:

1. The process of cleaning a windshield, comprising: distributing over a surface of such windshield potassium hydrogen tartrate, adding a spray of water to such windshield and tartrate, and wiping such surface with a rubber squeegee.

2. The process of cleaning an automobile windshield surface, comprising: wetting such surface, distributing potassium hydrogen tartrate in divided form over such windshield surface, adding water to such windshield and tartrate, and wiping such surface with a squeegee.

3. The process of cleaning a windshield, comprising: distributing over a surface of such windshield boric acid powder, adding water to such surface and acid, and squeegeeing such surface.

4. The process of cleaning a windshield, comprising: distributing over a surface of such windshield oxalic acid powder, adding water to such surface and acid, and squeegeeing such surface.

5. The process of cleaning a windshield, comprising: distributing over a surface of such windshield a cleaner selected from the group consisting of potassium hydrogen tartrate, boric acid and oxalic acid all in powdered form, wetting said surface and said cleaner, and wiping such surface with a squeegee.

References Cited in the file of this patent

UNITED STATES PATENTS

| 370,551 | McCarthy | Sept. 27, 1887 |
| 673,665 | Staley | May 7, 1901 |
| 1,386,362 | Pittman | Aug. 2, 1921 |
| 1,915,775 | Christen | June 27, 1933 |
| 2,515,193 | Chester | July 18, 1950 |

OTHER REFERENCES

Hackh: "Chemical Dictionary" (3rd edition), page 677, Blakiston, Phila., 1944. (Copy in Div. 11.)

Moore: "How to Clean Everything," pages 18 and 119, Simon and Schuster, New York, 1952. (Copy in Div. 11.)